Feb. 14, 1956

J. W. WURGLER 2,735,041

ELECTRIC PROTECTIVE SYSTEM UTILIZING
CLOSE DIFFERENTIAL RELAY
Filed Feb. 21, 1952

Inventor
John W. Wurgler
by Walter L. Wallis Jr.
Attorney

United States Patent Office 2,735,041
Patented Feb. 14, 1956

2,735,041

ELECTRIC PROTECTIVE SYSTEM UTILIZING CLOSE DIFFERENTIAL RELAY

John W. Wurgler, Milwaukee, Wis., assignor to Allis-Chalmers Manufacturing Company, Milwaukee, Wis.

Application February 21, 1952, Serial No. 272,738

7 Claims. (Cl. 317—49)

This invention relates in general to protective systems and in particular to protective systems of the close differential type.

In the operation of overload protective systems designed to perform an operation, usually the opening of a protective circuit breaker upon appearance of an overload condition, the protective circuit breaker is usually controlled by a control relay actuated in response to the overload. In such systems it is desirable to prevent operation of the circuit breaker on transient overloads so as to reduce the wear on the breaker and prevent unnecessary interruption of the protected circuit. This undesired operation may be prevented by providing a control relay having a very close differential of operating ampere turns and by providing a time delay relay actuated by the control relay for actuating the protective circuit breaker. Thus, if the overload which actuates the overload relay persists for a shorter time than the time delay of the time delay relay, the close differential control relay armature will be released to deactuate the time delay relay and thereby prevent operation of the protective circuit breaker.

One of the most suitable types of close differential relay is one utilizing an auxiliary coil which opposes the load current-carrying coil and which is energized upon appearance of an overload to reduce the net magnetomotive force acting on the relay to thereby cause the relay armature to drop out after the load current has decreased a small amount below the overload value. This auxiliary coil is preferably disposed in a flux path of the relay in such a manner that the auxiliary coil has a greater effect per ampere turn on the relay than the load current-carrying coil.

It is therefore an object of this invention to provide an improved electrical protective system in which performance of an overload protective operation is prevented if the overload condition persists for less than a predetermined time.

It is an additional object of the present invention to provide an improved electrical protective system in which performance of an overload protective operation by a protective device is prevented if the overload condition persists for less than a predetermined time and in which the protective device is automatically reset after such prevention.

Figure 1:
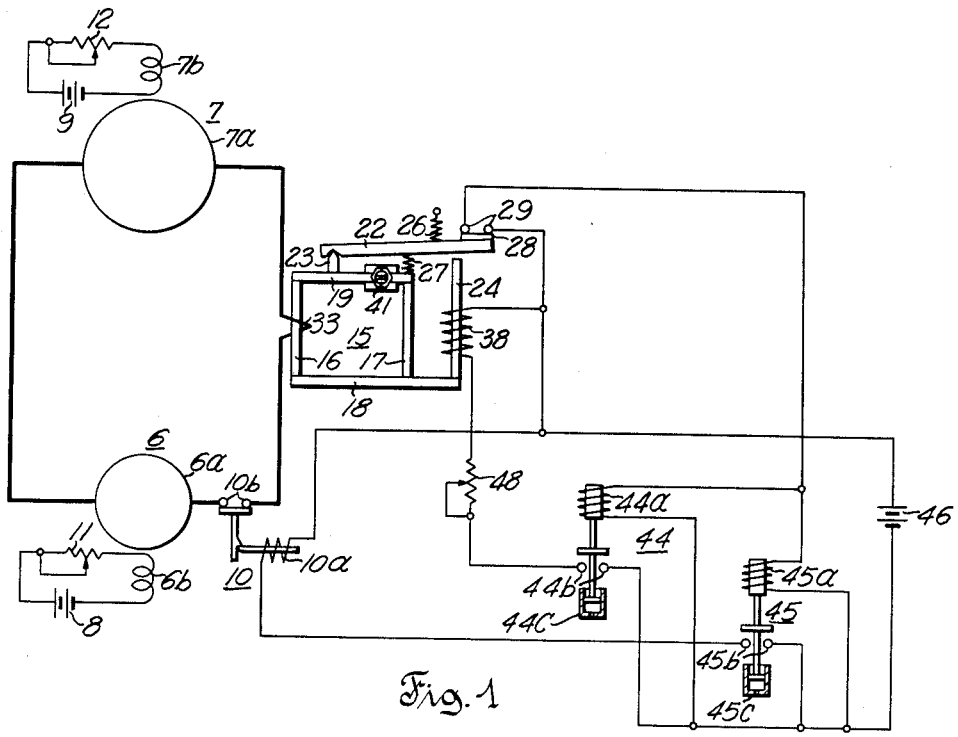
Figure 2:
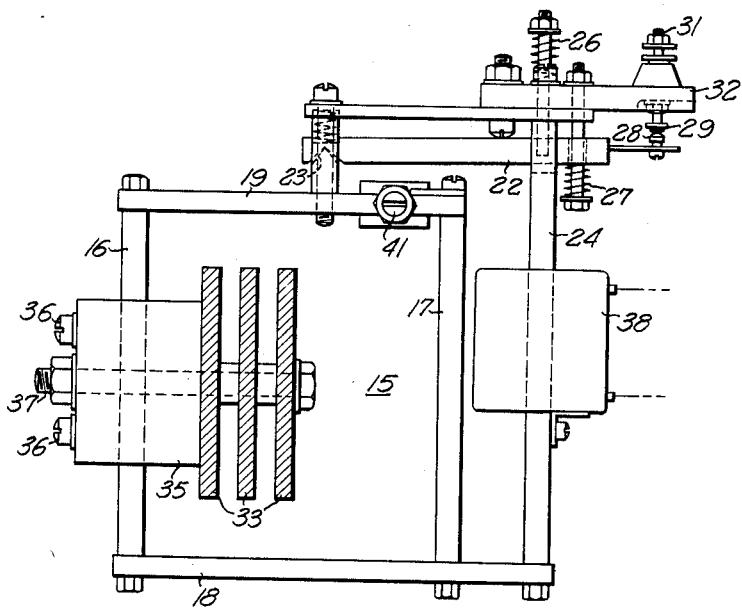

Objects and advantages other than those set forth above will be readily apparent from the following description when read in connection with the accompanying drawing, in which:

Fig. 1 diagrammatically illustrates the circuits and apparatus of the preferred embodiment of the invention, and Fig. 2 is a side view of the control relay utilized in the protective system of the invention.

Referring to Fig. 1, the preferred embodiment of the invention is illustrated in connection with the control of current supplied to a motor 6 from a generator 7. Motor 6 is provided with an armature winding 6a connected to generator armature winding 7a, through suitable switching means such as the contacts 10b of a protective circuit breaker 10 having a trip coil 10a. Field winding 6b of machine 6 is supplied with current from a battery 8 through an adjustable resistor 11. Field winding 7b is similarly supplied with current from a battery 9 through an adjustable resistor 12.

A control relay 15 is provided to control circuit breaker 10 in response to predetermined variations in the current supplied to motor 6. As shown more in detail in Fig. 2, relay 15 comprises a pair of spaced magnetic leg members 16, 17 connected at the bottom by a magnetic base member 18 and connected at the top by a magnetic bridging member 19. Relay 15 further comprises an armature 22 pivoted on a knife edge magnetic pivot member 23 secured to member 19. Armature 22 is attractable toward a pole piece formed by the end of an upright member 24 against the action of springs 26, 27. When armature 22 is in the released position shown, spring 27 is not compressed, so that only spring 26 holds armature 22 in the released position. When armature 22 is attracted, spring 27 is compressed so that the force of this spring is added to the force exerted by spring 26 to produce the desired combined spring characteristic. Relay 15 is provided with contact means in the form of movable contacts 28 carried by armature 22 and engageable with fixed contacts 29 secured to terminal studs 31. Studs 31 are secured to a terminal board 32 mounted on a nonmagnetic extension of member 24.

Suitable energizing means are provided for relay 15 and such means may, if relay 15 is of the through conductor type, comprise a plurality of parallel connected bus bar sections 33 representing an energizing coil and carrying the load circuit current. Sections 33 extend through the opening formed by members 16, 17, 18, 19, and relay 15 may be secured to bus bars 33 by a clamp 35, screws 36 and a bolt 37. It will be understood that if the current to be controlled is of small enough magnitude, the main energizing means may comprise a regular multiturn coil disposed on the relay. Disposed on upright member 24 is an auxiliary coil 38 for varying the net magnetomotive force acting on armature 22.

Relay 15 is provided with a pair of parallel magnetic branches, the first such branch comprising pivot means 23, armature 22, the air gap between armature 22 and member 24, member 24 and the portion of member 18 between members 17 and 24. The second branch comprises the portion of member 19 between pivot means 23 and member 17, and member 17. The second branch may be provided with adjustable magnetic means for varying the reluctance of the second branch. Such adjustable means may comprise a magnetic screw 41 engageable in an opening in member 19 to insert a varying amount of screw 41 in the opening to thereby vary the permeance of member 19.

Referring again to Fig. 1, the control coil of relay 15, represented by bus sections 33, is supplied with a current of magnitude dependent upon the magnitude of the current supplied from generator 7 to motor 6. Contacts 28, 29 control the connection of a pair of time delay relays 44, 45 to a suitable source of current such as a battery 46. Relay 44 is provided with an energizing coil 44a and contacts 44b. Relay 45 is similarly provided with an energizing coil 45a and contacts 45b. The time delay relays 44, 45 may be of any suitable known type, such as those utilizing dashpots 44c, 45c to provide time delays between the deenergization of coils 44a, 45a and the closing of contacts 44b, 45b, respectively. Relay 45 is adjusted to provide a longer time delay than relay 44.

Contacts 44b of relay 44 control the connection of auxiliary coil 38 to battery 46 through an adjustable resistor 48. Contacts 45b of relay 45 control the performance of an operation such as the energization of the trip coil 10a of protective circuit breaker 10.

In operation, with generator 7 supplying load current to motor 6, as long as this load current remains below a predetermined value, spring 26 retains armature 22 in the unattracted position against the attraction produced by coil 33. Contacts 28, 29 are thereby maintained closed to maintain the energization circuits for coils 44a, 45a. With coils 44a, 45a energized, contacts 44b, 45b are open to thereby prevent energization of auxiliary coil 38 and coil 10a of circuit breaker 10.

If the load circuit current increases above the predetermined value, the magnetomotive force of coil 33 is sufficient to attract armature 22 toward the pole piece formed by member 24. This action opens contacts 28, 29 to thereby deenergize coils 44a, 45a. Deenergization of coil 44a causes contacts 44b to be closed after a first predetermined time delay to connect auxiliary coil 38 to battery 46 through resistor 48. The time delay of relay 44 is adjusted so that contacts 44b close immediately after armature 22 has completed its travel toward the attracted position. This time delay prevents energization of auxiliary coil 38 before armature 22 has completed its travel to thereby prevent hunting or oscillation of armature 22.

Connection of coil 38 to source 46 causes current to be supplied to coil 38 in a direction to produce in relay 15 a magnetomotive force opposing the magnetomotive force of coil 33 to thereby reduce the net magnetomotive force acting on armature 22. The entire flux produced by coil 38 passes through the first magnetic branch of the relay which includes armature 22, while only a part of the entire flux produced by coil 33 passes through the first magnetic branch. Thus coil 33 is not as effective per ampere turn on armature 22 as is auxiliary coil 38.

If the load circuit current decreases a predetermined amount below the overload value during the time interval of the time delay of relay 45, the decreased energization of coil 33 is insufficient to retain armature 22 attracted against the opposing magnetomotive force of auxiliary coil 38 and springs 26, 27. Armature 22 is thus released and recloses contacts 28, 29 to reenergize coils 44a, 45a. Energization of coil 44a immediately opens contacts 44b to thereby disconnect auxiliary coil 38 from battery 46. Thus, relay 15 is reset and is again ready to sense an overload condition. By adjusting the position of screw 41, the permeance of member 19 may be varied to vary the division of flux between the first and second magnetic branches to thereby vary the value of current in coil 33 at which armature 22 is attracted. By adjustment of resistor 48, the magnetomotive force of auxiliary coil 38 may be adjusted to vary the value of the load circuit current at which armature 22 drops out so as to vary the difference between the values of load current causing pickup and dropout of armature 22. As armature 22 is held attracted by the action of coil 33, which only then is opposed by the action of coil 38, this difference will be considerably smaller by utilizing coil 38 than if only coil 33 was utilized. Energization of coil 45a produces no change in relay 45 under these conditions, since the time delay of this relay had not as yet permitted contacts 45b to close. Thus, protective circuit breaker 10 is prevented from operating on the transient overload.

If the load circuit current remains above the predetermined value for a time longer than the time delay of relay 45, contacts 45b are closed to energize trip coil 10a to trip circuit breaker 10 and thereby disconnect motor 6 from generator 7.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. In a protective system, the combination of a load circuit, a circuit breaker for said load circuit, a control relay having first and second differentially acting coils, an armature and contact means actuated by said armature, means for supplying to said first coil a control current of magnitude dependent upon the magnitude of the current of said load circuit to attract said armature to actuate said contact means when said load circuit current reaches a first predetermined value, a source of voltage of substantially constant value, a first time delay relay responsive to actuation of said contact means for connecting said second coil to said source a first predetermined time interval after said actuation, and a second time delay relay responsive to said actuation for operating said circuit breaker a second predetermined time interval after said actuation, said second interval being longer than said first interval, the value of the current in said second coil being so selected that a decrease of said load circuit current to a second predetermined value below said first predetermined value during said second time interval causes said armature to be released to prevent said second time delay relay from operating said circuit breaker.

2. In a protective system, the combination of load circuit, a circuit breaker for said load circuit, a control relay having first and second differentially acting coils, an armature and contact means actuated by said armature, means for supplying to said first coil a control current of magnitude dependent upon the magnitude of the current of said load circuit to attract said armature and thereby actuate said contact means when said load circuit current reaches a first predetermined value, a source of voltage of substantially constant value, a first time delay relay connected to said source through said contact means and deenergized by actuation of said contact means for connecting said second coil to said source a first predetermined time interval after said actuation, and a second time delay relay connected to said source through said contact means and deenergized by said actuation for operating said circuit breaker a second predetermined time interval after said actuation, said second interval being longer than said first interval, the value of the current in said second coil being so selected that a decrease of said load circuit current to a second predetermined value below said first predetermined value during said second time interval causes said armature to be released to prevent said second time delay relay from operating said circuit breaker.

3. In a protective system, the combination of a load circuit, a circuit breaker for said load circuit, a control relay having a first magnetic branch, a second magnetic branch, a first coil disposed to produce a magnetomotive force in said first and second branches, a second coil disposed to produce a magnetomotive force in said second branch in opposition to the magnetomotive force produced therein by said first coil, an armature disposed in said second branch and contact means actuated by said armature, means for supplying to said first coil a control current of magnitude dependent upon the magnitude of the current of said load circuit to attract said armature and thereby actuate said contact means when said load circuit current reaches a first predetermined value, a source of voltage of substantially constant value, a first time delay relay responsive to actuation of said contact means for connecting said second coil to said source a first predetermined time interval after said actuation, and a second time delay relay responsive to said actuation for operating said circuit breaker a second predetermined itme interval after said actuation, said second interval being longer than said first interval, the value of the current in said second coil being so selected that a decrease of said load circuit current to a second predetermined value below said first predetermined value during said second time interval causes said armature to be released to prevent said second time delay relay from operating said circuit breaker.

4. In a protective system, the combination of a load circuit, a circuit breaker for said load circuit, a control relay having a first magnetic branch, a second magnetic branch in parallel with said first branch, a first coil disposed to produce a magnetomotive force in said first and second branches, a second coil disposed to produce a magnetomotive force in said second branch in opposition to the magnetomotive force produced therein by said first coil, an armature disposed in said second branch and contact means actuated by said armature, means for supplying to said first coil a control current of magnitude dependent upon the magnitude of the current of said load circuit to attract said armature and thereby actuate said contact means when said load circuit current reaches a first predetermined value, a source of voltage of substantially constant value, a first time delay relay responsive to actuation of said contact means for connecting said second coil to said source a first predetermined time interval after said actuation, and a second time delay relay responsive to said actuation for operating said circuit breaker a second predetermined time interval after said actuation, said second interval being longer than said first interval, the value of the current in said second coil being so selected that a decrease of said load circuit current to a second predetermined value below said first predetermined value during said second time interval causes said armature to be released to prevent said second time delay relay from operating said circuit breaker.

5. In a protective system, the combination of a load circuit, a circuit breaker for said load circuit, a control relay having a first magnetic branch, a second magnetic branch, a first coil disposed to produce a magnetomotive force in said first and second branches, a second coil disposed to produce a magnetomotive force in said second branch in opposition to the magnetomotive force produced therein by said first coil, adjustable magnetic means movable to vary the magnetic reluctance of said first branch, an armature disposed in said second branch and contact means actuated by said armature, means for supplying to said first coil a control current of magnitude dependent upon the magnitude of the current of said load circuit to attract said armature and thereby actuate said contact means when said load circuit current reaches a first predetermined value determined in part by the position of said adjustable magnetic means, a source of voltage of substantially constant value, a first time delay relay responsive to actuation of said contact means for connecting said second coil to said source a first predetermined time interval after said actuation, and a second time delay relay responsive to said actuation for operating said circuit breaker a second predetermined time interval after said actuation, said second interval being longer than said first interval, the value of the current in said second coil being so selected that a decrease of said load circuit current to a second predetermined value below said first predetermined value during said second time interval causes said armature to be released to prevent said second time delay relay from operating said circuit breaker.

6. In a protective system, the combination of a load circuit, a circuit breaker for said load circuit, a control relay having a first magnetic branch, a second magnetic branch, a first coil disposed to produce a magnetomotive force in said first and second branches, a second coil disposed to produce a magnetomotive force in said second branch in opposition to the magnetomotive force produced therein by said first coil, adjustable magnetic means movable to vary the magnetic reluctance of said first branch, an armature disposed in said second branch and contact means actuated by said armature, means for supplying to said first coil a control current of magnitude dependent upon the magnitude of the current of said load circuit to attract said armature and thereby actuate said contact means when said load circuit current reaches a first predetermined value determined in part by the position of said adjustable magnetic means, a source of voltage of substantially constant value, a first time delay relay responsive to actuation of said contact means for connecting said second coil to said source a first predetermined time interval after said actuation, and a second time delay relay responsive to said actuation for operating said circuit breaker a second predetermined time interval after said actuation, said second interval being longer than said first interval, whereby a decrease of said load circuit current to a second predetermined value below said first predetermined value during said second time interval causes said armature to be released to prevent said second time delay relay from operating said circuit breaker, and means for varying the magnitude of the current supplied from said source to said second coil to vary said second predetermined value of said load circuit current at which said armature is released.

7. In a protective system, the combination of a load circuit, a circuit breaker for said load circuit, a control relay having a first magnetic branch, a second magnetic branch, a first coil disposed to produce a magnetomotive force in said first and second branches, a second coil disposed to produce a magnetomotive force in said second branch in opposition to the magnetomotive force produced therein by said first coil, an armature disposed in said second branch and contact means actuated by said armature, means for supplying to said first coil a control current of magnitude dependent upon the magnitude of the current of said load circuit to attract said armature and thereby actuate said contact means when said load circuit current reaches a first predetermined value, a source of voltage of substantially constant value, a first time delay relay responsive to actuation of said contact means for connecting said second coil to said source a first predetermined time interval after said actuation, a second time delay relay responsive to said actuation for operating said circuit breaker a second predetermined time interval after said actuation, said second interval being longer than said first interval, whereby a decrease of said load circuit current to a second predetermined value below said first predetermined value during said second time interval causes said armature to be released to prevent said second time delay relay from operating said circuit breaker, and means for varying the magnitude of the current supplied from said source to said second coil to vary said second predetermined value of said load circuit current at which said armature is released.

References Cited in the file of this patent

UNITED STATES PATENTS

| | | |
|---|---|---|
| 1,893,348 | Anderson | Jan. 3, 1933 |
| 2,172,950 | Anderson | Sept. 12, 1939 |
| 2,434,595 | Sonnemann et al. | Jan. 13, 1948 |

FOREIGN PATENTS

| | | |
|---|---|---|
| 307,318 | Germany | Aug. 14, 1918 |